(12) United States Patent
Jiang et al.

(10) Patent No.: US 12,237,504 B2
(45) Date of Patent: Feb. 25, 2025

(54) ANODE MATERIAL, ELECTROCHEMICAL DEVICE AND ELECTRONIC DEVICE USING THE SAME

(71) Applicant: Ningde Amperex Technology Limited, Ningde (CN)

(72) Inventors: Daoyi Jiang, Ningde (CN); Hang Cui, Ningde (CN); Yuansen Xie, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 802 days.

(21) Appl. No.: 17/312,208

(22) PCT Filed: Dec. 17, 2019

(86) PCT No.: PCT/CN2019/125945
§ 371 (c)(1),
(2) Date: Jun. 9, 2021

(87) PCT Pub. No.: WO2020/125621
PCT Pub. Date: Jun. 25, 2020

(65) Prior Publication Data
US 2022/0052327 A1 Feb. 17, 2022

(30) Foreign Application Priority Data
Dec. 17, 2018 (CN) .................. 201811541619.8

(51) Int. Cl.
| | |
|---|---|
| H01M 4/48 | (2010.01) |
| H01M 4/02 | (2006.01) |
| H01M 4/04 | (2006.01) |
| H01M 4/36 | (2006.01) |
| H01M 4/583 | (2010.01) |
| H01M 10/0525 | (2010.01) |

(52) U.S. Cl.
CPC .......... H01M 4/48 (2013.01); H01M 4/0471 (2013.01); H01M 4/366 (2013.01); H01M 4/583 (2013.01); H01M 10/0525 (2013.01); H01M 2004/021 (2013.01)

(58) Field of Classification Search
None
See application file for complete search history.

(56) References Cited

U.S. PATENT DOCUMENTS

| | | | |
|---|---|---|---|
| 2011/0086271 A1 | 4/2011 | Lee et al. | |
| 2012/0115033 A1* | 5/2012 | Kim | H01M 4/366 252/503 |
| 2012/0244428 A1 | 9/2012 | Park et al. | |
| 2014/0057176 A1 | 2/2014 | Park et al. | |
| 2014/0294981 A1 | 10/2014 | Fichtner et al. | |
| 2015/0056507 A1* | 2/2015 | Dadheech | H01M 4/139 429/218.1 |
| 2015/0311507 A1 | 10/2015 | Miki et al. | |

FOREIGN PATENT DOCUMENTS

| | | |
|---|---|---|
| CN | 102054983 A | 5/2011 |
| CN | 102468483 A | 5/2012 |
| CN | 103035899 A | 4/2013 |
| CN | 104051714 A | 9/2014 |
| CN | 104364942 A | 2/2015 |
| CN | 104538609 A | 4/2015 |
| CN | 105244488 A | 1/2016 |
| CN | 105406050 A | 3/2016 |
| CN | 105514390 A | 4/2016 |
| CN | 105591080 A | 5/2016 |
| CN | 105742599 A | 7/2016 |
| CN | 106784714 A | 5/2017 |
| CN | 106941170 A | 7/2017 |
| CN | 107623104 A | 1/2018 |
| CN | 107710466 A | 2/2018 |
| CN | 107959012 A | 4/2018 |
| CN | 108023074 A | 5/2018 |
| CN | 108511719 A | 9/2018 |

(Continued)

OTHER PUBLICATIONS

Office Action issued on Aug. 31, 2023, in corresponding Vietnamese Application No. 1-2021-01746, 3 pages.
Examination Report issued on Feb. 12, 2022, in corresponding Australian Application No. 2019411630, 4 pages.
Notice of Acceptance issued on Jul. 11, 2022, in corresponding Australian Application No. 2019411630, 4 pages.
Notification to Grant Patent Right for Invention issued on Jul. 17, 2020, in corresponding Chinese Application No. 201811541619.8, 6 pages.
Supplementary European Search Report issued on Nov. 25, 2021, in corresponding European Application No. 19899657, 3 pages.
Examination Report issued on Jan. 20, 2022, in corresponding Indian Application No. 202127008177, 5 pages.
Office Action issued on Mar. 29, 2022, in corresponding Japanese Application No. 2021-512505, 8 pages.
Office Action issued on Sep. 27, 2022, in corresponding Japanese Application No. 2021-512505, 4 pages.
Decision to Grant a Patent issued on Mar. 7, 2023, in corresponding Japanese Application No. 2021-512505, 5 pages.
International Search Report and Written Opinion issued on Mar. 19, 2020 in corresponding International Application No. PCT/CN2019/125945; 10 pages.
Office Action issued on Mar. 18, 2020 in corresponding Chinese Application No. 201811541619.8; 20 pages.
Office Action issued on Jan. 21, 2021 in corresponding Chinese Application No. 202010870352.8; 22 pages.

*Primary Examiner* — Haroon S. Sheikh
*Assistant Examiner* — Claire A Rutiser
(74) *Attorney, Agent, or Firm* — Maier & Maier, PLLC (57) ABSTRACT

An anode material includes a silicon compound $SiO_x$, where x is about 0.5 to 1.5; an oxide $MeO_y$ layer, the $MeO_y$ layer coating the silicon compound $SiO_x$, where y is about 0.5 to 3; and a carbon layer, the carbon layer coating the $MeO_y$ layer. Me includes at least one of Al, Si, Ti, Mn, V, Cr, Co, and Zr. The surface of the $MeO_y$ layer adjacent to the carbon layer has an open pore structure, and at least part of the open pore structure is filled with the carbon layer. The anode material improves the cycle performance of the electrochemical device and significantly reduce the impedance of the electrochemical device.

19 Claims, 2 Drawing Sheets

(56) References Cited

FOREIGN PATENT DOCUMENTS

| | | |
|---|---|---|
| CN | 109638254 A | 4/2019 |
| CN | 110048114 A | 7/2019 |
| EP | 2 450 986 A1 | 5/2012 |
| JP | 2009064576 A | 3/2009 |
| JP | 2013-157120 A | 8/2013 |
| JP | 2018081753 A | 5/2018 |
| KR | 20120066349 A | 6/2012 |
| WO | 2009/031036 A2 | 3/2009 |

* cited by examiner

ANODE MATERIAL, ELECTROCHEMICAL DEVICE AND ELECTRONIC DEVICE USING THE SAME

CROSS REFERENCE TO RELATED APPLICATIONS

The present application is a National Stage application of PCT international application: PCT/CN2019/125945, filed on Dec. 17, 2019, which claims the priority of Chinese patent application 201811541619.8, filed on Dec. 17, 2018, the disclosure of which is hereby incorporated by reference in its entirety.

BACKGROUND

1. Technical Field

The present application relates to the field of energy storage, particularly to an anode material and an electrochemical device and an electronic device using the same, and more particularly to a lithium ion battery.

2. Description of the Related Art

Electrochemical devices (for example, lithium ion batteries) have entered the daily lives of people with the advances in technology and environmental protection. In recent years, silicon has been considered to be the anode material of a lithium ion battery that is most likely to be applied on a large scale because the reversible capacity of silicon is up to 4,200 mAh/g. However, the volume expansion of silicon is about 400% during charging and discharging. Ultra-high volume expansion will cause the destruction of the solid electrolyte interface (SEI) membrane, and the fresh surface of the material is continuously exposed, thereby continuously consuming the electrolytic solution, and leading to repeated formation of the SEI. Although silicon-oxygen material has a certain decrease in capacity compared with pure silicon, silicon-oxygen material can significantly reduce volume expansion to some extent. Volume expansion can be controlled to be only 120-160% by reasonably designing the silicon-oxygen ratio and particle size thus optimizing the cell preparation process. However, the current requirement for the high cycle life of lithium ion batteries cannot yet be achieved.

In view of this, in order to meet the requirement for high cycle life, it is necessary to further refine and improve the structure of the anode material.

SUMMARY

The embodiments of the present application provide an anode material and a method for preparing the same in an attempt to solve at least one of the problems in the related art to at least some extent. The embodiments of the present application also provide an anode, an electrochemical device and an electronic device using the anode material.

In one embodiment, the present application provides an anode material, including:
- a silicon compound $SiO_x$, wherein x is about 0.5 to 1.5;
- an oxide $MeO_y$ layer, wherein the $MeO_y$ layer coats the silicon compound $SiO_x$, wherein Me includes at least one of Al, Si, Ti, Mn, V, Cr, Co, and Zr, wherein y is about 0.5 to 3; and
- a carbon layer, wherein the carbon layer coats the $MeO_y$ layer;

wherein the surface of the $MeO_y$ layer adjacent to the carbon layer has an open pore structure, and at least part of the open pore structure is filled with the carbon layer.

In another embodiment, the present application provides a method for preparing an anode material, wherein the method includes:
(1) forming a mixed solution of $SiO_x$ powder, a pore-forming agent and an oxide precursor $MeX_n$ in the presence of an organic solvent and deionized water;
drying the mixed solution to obtain powder; and
sintering the powder at about 250° C. to 900° C. for about 0.5 h to 24 h to obtain silicon compound $SiO_x$ particles coated with an oxide $MeO_y$ layer; and
(2) mixing the silicon compound $SiO_x$ particles coated with the $MeO_y$ layer, an organic solvent and a carbon precursor to form a mixed solution;
drying the mixed solution to obtain powder; and
sintering the powder at about 700° C. to 1400° C. for about 0.5 h to 24 h to obtain the anode material;
wherein x is about 0.5 to 1.5 and y is about 0.5 to 3,
wherein Me includes at least one of Al, Si, Ti, Mn, Cr, V, Co, and Zr,
wherein X includes at least one of a methoxy group, an ethoxy group, an isopropoxy group, and halogen, and
wherein n is 1, 2, 3 or 4.

In another embodiment, the present application provides an anode, including the anode material according to the present application.

In another embodiment, the present application provides an electrochemical device, including the anode according to the present application.

In another embodiment, the present application provides an electronic device, including the electrochemical device according to the present application.

Since the material would expand and shrink during charging and discharging, a tight coating structure can effectively alleviate structural damage during the process. On the other hand, the destruction of the material will generate a fresh interface, and a large amount of SEI by-products will be produced after multiple cycles. When the interface is not tightly or firmly bonded, such thick layer of by-products will promote and accelerate the peeling of the carbon layer, thereby accelerating the attenuation and failure of the material.

The main methods for improving the cycle performance of the silicon-oxygen material include the following: coating a silicon-oxygen material with carbon, disposing an intermediate gap layer in the middle of the carbon-coated silicon-oxygen material, reducing the size of a silicon-oxygen material, coating a silicon-oxygen material with a polymer, and the like. In these coating methods, the carbon-coated material has better electronic conductivity and higher stability. However, the carbon-coated silicon-oxygen material is likely to be decarburized due to repeated shearing forces during the processing of the battery electrode, and therefore the coulombic efficiency is affected. The SEI membrane formation consumes the electrolytic solution. On the other hand, the expansion and contraction and cracking of the silicon during multiple cycles causes the carbon layer to be easily peeled off the substrate, and be wrapped by the by-products with the SEI being formed, thereby greatly increasing the electrochemical impedance and polarization, and affecting the cycle life. Therefore, the improvement of the interfacial bonding performance between the carbon layer and the silicon-oxygen material is very important for improving the cycle life and improving the stability of the cycle structure.

In the anode material provided according to the present application, the oxide $MeO_y$ layer has an amorphous structure and contains pore structures therein. On the one hand, these pore structures can increase the transmission of lithium ions in the material and reduce the internal resistance of polarization. On the other hand, the surface of the oxide $MeO_y$ layer adjacent to the carbon layer also has open pore structures, and the carbon precursor can penetrate into these open pore structures, so that the sintered carbon layer is more tightly bonded to the oxide $MeO_y$ layer. An interlocking effect is generated, thereby effectively improving the interfacial bonding force between the carbon layer and the substrate. Further, the oxide $MeO_y$ layer and the silicon-oxygen material substrate can form a good connection by the chemical bonds "Me-O—Si". Therefore, such structural design can significantly improve the structural stability of the material during the cycle, so that the cycle life is significantly improved.

Additional aspects and advantages of the embodiments of the present application will be described and shown in part in the following explanation or set forth by implementation of the embodiments of the present application.

BRIEF DESCRIPTION OF THE DRAWINGS

The drawings, which are necessary to describe the examples of the present application or the prior art, will be briefly described below to facilitate the description of the examples of the present application. It is obvious that the drawings in the following description are only part of the examples of the present application. Those skilled in the art could obtain the drawings of other examples according to the structures illustrated in these drawings without the need to pay creative work.

FIG. 3 shows cycle attenuation curves of lithium ion batteries of Example 2 and

Comparative Example 4 according to the present application;

DETAILED DESCRIPTION

Examples of the present application will be described in detail below. The examples of the present application should not be construed as limiting the present application.

As used herein, the term "about" is used to describe and explain a small variation. When used in connection with an event or circumstance, the term may refer to an example in which the event or circumstance occurs precisely and an example in which the event or circumstance occurs approximately. For example, when used in connection with a value, the term may refer to a range of variation less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, less than or equal to ±0.05%, etc. In addition, quantities, ratios, and other values are sometimes presented in a range format in the present application. It should be understood that the range format is intended for convenience and briefness and should be understood flexibly. Not only are the values explicitly limited in the range contained, but also all individual values or sub-ranges covered within the range are contained as each value and each sub-range are explicitly specified.

I. Anode Material

The examples of the present application provide an anode material, the anode material including:
  a silicon compound $SiO_x$, wherein x is about 0.5 to 1.5;
  an oxide $MeO_y$ layer, wherein the $MeO_y$ layer coats the silicon compound $SiO_x$, wherein Me includes at least one of Al, Si, Ti, Mn, V, Cr, Co, and Zr, wherein y is about 0.5 to 3; and
  a carbon layer, wherein the carbon layer coats the $MeO_y$ layer;
  wherein the surface of the $MeO_y$ layer adjacent to the carbon layer has an open pore structure, and at least part of the open pore structure is filled with the carbon layer.

In some examples, the $MeO_y$ layer has a non-open pore structure.

In some examples, the silicon compound $SiO_x$ contains SiO, $SiO_2$, or a combination thereof.

In some examples, the $MeO_y$ layer contains $TiO_2$, $Al_2O_3$, or a combination thereof.

In some examples, the $MeO_y$ layer contains carbon, wherein, based on the total weight of the silicon compound $SiO_x$ and the $MeO_y$ layer, the content of the carbon in the $MeO_y$ layer is about 0.1 wt % to 1 wt %.

In some examples, the $MeO_y$ layer contains carbon, wherein, based on the total weight of the silicon compound $SiO_x$ and the $MeO_y$ layer, the content of the carbon in the $MeO_y$ layer is about 0.2 wt % to 0.8 wt %.

In some examples, the $MeO_y$ layer contains carbon, wherein, based on the total weight of the silicon compound $SiO_x$ and the $MeO_y$ layer, the content of the carbon in the $MeO_y$ layer is about 0.2 wt % to 0.6 wt %.

In some examples, the $MeO_y$ layer contains carbon, wherein, based on the total weight of the silicon compound $SiO_x$ and the $MeO_y$ layer, the content of the carbon in the $MeO_y$ layer is about 0.2 wt % to 0.4 wt %.

In some examples, the average particle diameter of the silicon compound $SiO_x$ is about 500 nm to 30 μm. In some embodiments, the average particle diameter of the silicon compound $SiO_x$ is about 1 μm to 30 μm. In some examples, the average particle diameter of the silicon compound $SiO_x$ is about 3 μm to 8 μm.

In some examples, the thickness of the $MeO_y$ layer is about 2 nm to 1000 nm. In some examples, the thickness of the $MeO_y$ layer is about 10 nm to 500 nm. In some examples, the thickness of the $MeO_y$ layer is about 10 nm to 50 nm. In some examples, the thickness of the $MeO_y$ layer is about 5 nm to 50 nm.

In some examples, the thickness of the carbon layer is about 2 nm to 1000 nm. In some examples, the thickness of the carbon layer is about 10 nm to 100 nm. In some examples, the thickness of the carbon layer is about 10 nm to 50 nm.

In some examples, the content of the carbon contained in the anode material is about 1 wt % to 10 wt % based on the total weight of the anode material.

In some examples, the content of the carbon contained in the anode material is about 1 wt % to 8 wt % based on the total weight of the anode material.

In some examples, the content of the carbon contained in the anode material is about 1 wt % to 6 wt % based on the total weight of the anode material.

In some examples, the content of the carbon contained in the anode material is about 2 wt % to 5 wt % based on the total weight of the anode material.

In some examples, the specific surface area of the anode material is about 2 cm$^2$/g to 20 cm$^2$/g. In some examples, the specific surface area of the anode material is about 5 cm$^2$/g to 20 cm$^2$/g. In some examples, the specific surface area of the anode material is about 5 cm$^2$/g to 10 cm$^2$/g.

II. Method for Preparing Anode Material

The examples of the present application provide a method for preparing any above anode material, including:
(1) forming a mixed solution of $SiO_x$ powder, a pore-forming agent and an oxide precursor $MeX_n$ in the presence of an organic solvent and deionized water; drying the mixed solution to obtain powder; and sintering the powder at about 250° C. to 900° C. for about 0.5 h to 24 h to obtain silicon compound $SiO_x$ particles coated with an oxide $MeO_y$ layer;
(2) mixing the silicon compound $SiO_x$ particles coated with the $MeO_y$ layer, an organic solvent and a carbon precursor to form a mixed solution; drying the mixed solution to obtain powder; and sintering the powder at about 400° C. to 1000° C. for about 0.5 h to 24 h to obtain the anode material;
wherein x is about 0.5 to 1.5 and y is about 0.5 to 3,
wherein Me includes at least one of Al, Si, Ti, Mn, Cr, V, Co, and Zr,
wherein X includes at least one of a methoxy group, an ethoxy group, an isopropoxy group, and halogen, and
wherein n is 1, 2, 3 or 4.

According to some examples of the present application, the pore-forming agent includes at least one of the following compounds: polyvinylpyrrolidone, polyethylene oxide-polypropylene oxide-polyethylene oxide triblock copolymer, hexadecyl trimethyl ammonium bromide, and octadecyl trimethylammonium bromide.

According to some examples of the present application, the carbon precursor is a mixture of phenolic resin and hexamethylenetetramine, wherein the weight ratio of the phenolic resin to the hexamethylenetetramine is about 12:1 to 6:1. According to some examples of the present application, the weight ratio of the phenolic resin to hexamethylenetetramine is about 10:1 to 8:1. According to some examples of the present application, the weight ratio of the phenolic resin to hexamethylenetetramine is about 9:1.

According to some examples of the present application, the oxide precursor $MeX_n$ contains isopropyl titanate, aluminum isopropoxide or a combination thereof.

According to some examples of the present application, the organic solvent includes at least one of the following solvents: ethanol, methanol, n-hexane, N,N-dimethylformamide, pyrrolidone, acetone, toluene, isopropanol, and n-propyl alcohol. According to some examples of the present application, the organic solvent is ethanol.

According to some examples of the present application, the sintering temperature in step (1) is about 300° C. to 800° C. According to some examples of the present application, the sintering temperature in step (1) is about 400° C. to 700° C. According to some examples of the present application, the sintering temperature in step (1) is about 400° C. to 650° C.

According to some examples of the present application, the sintering time in step (1) is about 1 h to 20 h. According to some examples of the present application, the sintering time in step (1) is about 1 h to 15 h. According to some examples of the present application, the sintering time in step (1) is about 1 h to 10 h. According to some examples of the present application, the sintering time in step (1) is about 1.5 h to 5 h.

According to some examples of the present application, the sintering temperature in step (2) is about 700° C. to 1300° C. According to some examples of the present application, the sintering temperature in step (2) is about 700° C. to 1200° C. According to some examples of the present application, the sintering temperature in step (2) is about 800° C. to 1100° C.

According to some examples of the present application, the sintering time in step (2) is about 1 h to 20 h. According to some examples of the present application, the sintering time in step (2) is about 1 h to 15 h. According to some examples of the present application, the sintering time in step (2) is about 1 h to 10 h. According to some examples of the present application, the sintering time in step (2) is about 1.5 h to 5 h.

According to some examples of the present application, the sintering in both step (1) and step (2) is carried out under the protection of inert gas. According to some examples of the present application, the inert gas includes nitrogen, argon or a combination thereof.

According to some examples of the present application, the drying in step (1) and step (2) is spray drying, and the drying temperature is about 100° C. to 300° C.

During the preparation of the anode material of the present application, the pore-forming agent is used in the preparation method of the present application. Since the pore-forming agent used in the present application is an organic polymer, the pore-forming agent will produce residual carbons in the oxide $MeO_y$ layer after sintering. These residual carbons are favorable for increasing the conductivity of the oxide $MeO_y$ layer, thereby increasing the conductivity of the anode material.

As described above, based on the total weight of the silicon compound $SiO_x$ and the oxide $MeO_y$ layer, the content of the residual carbons in the $MeO_y$ layer is about 0.1 wt % to 1 wt %, about 0.2 wt % to 0.8 wt %, about 0.2 wt % to 0.6 wt % or about 0.2 wt % to 0.4 wt %.

On the other hand, the obtained oxide $MeO_y$ layer has pore structures due to the use of the pore-forming agent. The surface of the oxide $MeO_y$ layer adjacent to the carbon layer has open pore structures, and the carbon precursor can penetrate into at least part of these open pore structures, so that these open pore structures are filled with the carbon layer obtained after sintering. Therefore, the carbon layer is more tightly bonded to the oxide $MeO_y$ layer, and an interlocking effect is generated, thereby effectively enhancing the interfacial bonding force between the carbon and the substrate.

Figure 1:
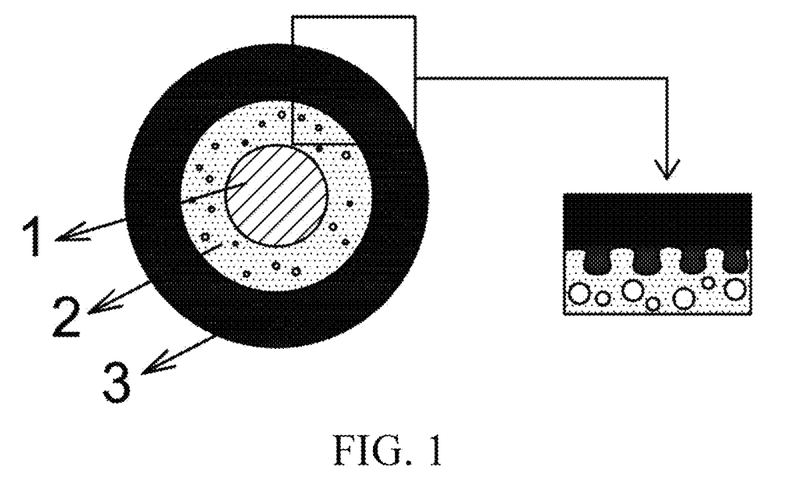
FIG. 1 shows a schematic structural diagram of an anode material according to the present application.
Figure 2A:
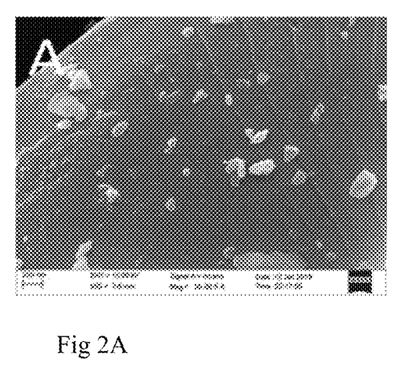
FIG. 2A is a scanning electron microscope (SEM) picture of the surface of an uncoated silicon monoxide material.
Figure 2B:
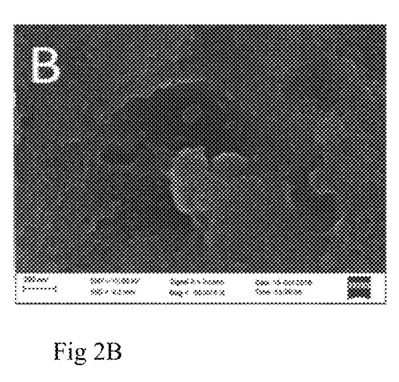
FIG. 2B is a SEM picture of the surface of the silicon monoxide material coated with a porous oxide layer.
Figure 2C:
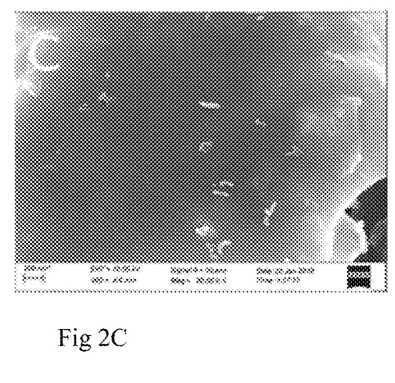
FIG. 2C is an SEM picture of the surface of the anode material in Example 2 of the present application.
Figure 2D:
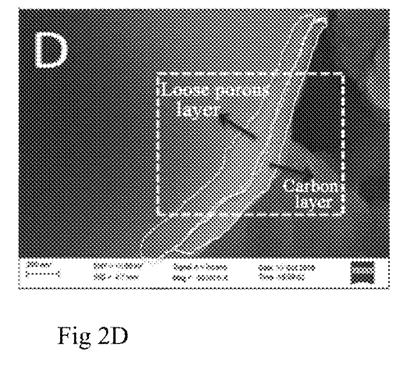
FIG. 2D is a cross-sectional SEM picture of the anode material in Example 2 of the present application.

FIG. 1 shows a schematic structural diagram of an anode material of the present application. The inner layer 1 is a silicon-oxygen material, the intermediate layer 2 is a porous oxide layer, and the outer layer 3 is a carbon layer. In addition, FIG. 1 shows an enlarged view of the interface between the intermediate layer 2 and the outer layer 3. It can be seen from the enlarged view that the intermediate layer 2 has pore structures, and the surface of the oxide layer adjacent to the carbon layer also has open pore structures, and at least part of the open pore structures are filled with the carbon layer.

III. Anode

The examples of the present application provide an anode. The anode includes a current collector and an anode active material layer on the current collector. The anode active material layer includes the anode material according to the examples of the present application.

In some examples, the anode active material layer includes a binder. In some examples, the binder includes, but is not limited to, polyvinyl alcohol, carboxymethyl cellulose, hydroxypropyl cellulose, diacetyl cellulose, polyvinyl chloride, carboxylated polyvinyl chloride, polyvinyl fluoride, ethoxy-containing polymer, polyvinylpyrrolidone, polyurethane, polytetrafluoroethylene, polyvinylidene fluoride, polyethylene, polypropylene, styrene butadiene rubber, acrylic acid (esterified) butadiene styrene rubber, epoxy, and nylon.

In some examples, the anode active material layer contains a conductive material. In some examples, the conductive material includes, but is not limited to, natural graphite, artificial graphite, carbon black, acetylene black, ketjen black, carbon fiber, metal powder, metal fiber, copper, nickel, aluminum, silver, and polyphenylene derivatives.

In some examples, the current collector includes, but is not limited to, a copper foil, a nickel foil, a stainless steel foil, a titanium foil, nickel foam, copper foam, or a polymeric substrate coated with a conductive metal.

In some examples, the anode may be obtained by the following method: mixing the active material, the conductive material, and the binder in a solvent to prepare an active material composition, and coating the active material composition on the current collector.

In some examples, the solvent may include N-methylpyrrolidone or the like, but is not limited thereto.

IV. Cathode

The materials, compositions, and manufacturing methods capable of being used for a cathode in the examples of the present application include any of the technologies disclosed in the prior art. In some examples, the cathode is the cathode described in Patent Application U.S. Pat. No. 9,812,739B, which is incorporated herein in its entirety by reference.

In some examples, the cathode includes a current collector and a cathode active material layer on the current collector.

In some examples, the cathode active material includes, but is not limited to, lithium cobalt oxide ($LiCoO_2$), lithium nickel cobalt manganese (NCM) ternary material, lithium iron phosphate ($LiFePO_4$), and lithium manganate ($LiMn_2O_4$).

In some examples, the cathode active material layer further includes a binder, and optionally a conductive material. The binder increases the bonding among the particles of the cathode active material, and also improves the bonding between the cathode active material and the current collector.

In some examples, the binder includes, but is not limited to, polyvinyl alcohol, hydroxypropyl cellulose, diacetyl cellulose, polyvinyl chloride, carboxylated polyvinyl chloride, polyvinyl fluoride, ethoxy-containing polymer, polyvinylpyrrolidone, polyurethane, polytetrafluoroethylene, polyvinylidene fluoride, polyethylene, polypropylene, styrene butadiene rubber, acrylic acid (esterified) styrene butadiene rubber, epoxy resin, nylon, etc.

In some examples, the conductive material includes, but is not limited to, a carbon-based material, a metal based material, a conductive polymer, and mixtures thereof. In some examples, the carbon-based material is selected from natural graphite, artificial graphite, carbon black, acetylene black, ketjen black, carbon fiber, or any combination thereof. In some examples, the metal-based material is selected from consisting of metal powder, metal fiber, copper, nickel, aluminum, and silver. In some examples, the conductive polymer is a polyphenylene derivative.

In some examples, the current collector may be aluminum, but is not limited thereto.

The cathode may be prepared by a preparing method well known in the art. For example, the cathode may be obtained by the following method: mixing the active material, the conductive material, and the binder in a solvent to prepare an active material composition, and coating the active material composition on the current collector. In some examples, the solvent may include N-methylpyrrolidone or the like, but is not limited thereto.

V. Electrolytic Solution

The electrolytic solution which can be used in the examples of the present application may be the electrolytic solution known in the art.

In some examples, the electrolytic solution includes an organic solvent, a lithium salt, and an additive. The organic solvent of the electrolytic solution according to the present application may be any organic solvent known in the art as a solvent for the electrolytic solution. The electrolyte used in the electrolytic solution according to the present application is not limited, and may be any electrolyte known in the art. The additive of the electrolytic solution according to the present application may be any additive known in the art as an additive of an electrolytic solution.

In some examples, the organic solvent includes, but is not limited to, ethylene carbonate (EC), propylene carbonate (PC), diethyl carbonate (DEC), ethyl methyl carbonate (EMC), dimethyl carbonate (DMC), propylene carbonate and ethyl propionate.

In some examples, the lithium salt includes at least one of an organic lithium salt or an inorganic lithium salt.

In some examples, the lithium salt includes, but is not limited to, lithium hexafluorophosphate ($LiPF_6$), lithium tetrafluoroborate ($LiBF_4$), lithium difluorophosphate ($LiPO_2F_2$), lithium bistrifluoromethanesulfonimide LiN$(CF_3SO_2)_2$(LiTFSI), lithium bis(fluorosulfonyl)imide Li(N$(SO_2F)_2$)(LiFSI), lithium bis(oxalate)borate $LiB(C_2O_4)_2$(LiBOB), and lithium difluorooxalate borate $LiBF_2(C_2O_4)$ (LiDFOB).

In some examples, the concentration of the lithium salt in the electrolytic solution is: about 0.5 mol/L to 3 mol/L, about 0.5 mol/L to 2 mol/L, or about 0.8 mol/L to 1.5 mol/L.

VI. Separator

In some examples, a separator is disposed between the cathode and the anode to prevent a short circuit. The material and shape of the separator which can be used in the examples of the present application are not particularly limited, and can be any of the technologies disclosed in the prior art. In some examples, the separator includes a polymer or inorganic material or the like formed by a material that is stable with the electrolytic solution of the present application.

For example, the separator may include a substrate layer and a surface treatment layer. The substrate layer is a nonwoven fabric, a membrane or a composite membrane having a porous structure, and the material of the substrate layer is at least one selected from polyethylene, polypropylene, polyethylene terephthalate, and polyimide. Specifically, a polypropylene porous membrane, a polyethylene porous membrane, a polypropylene nonwoven fabric, a polyethylene nonwoven fabric, or a polypropylene-polyethylene-polypropylene porous composite membrane may be used.

The surface treatment layer is disposed on at least one surface of the substrate layer, and the surface treatment layer may be a polymer layer or an inorganic layer, or may be a layer formed by mixing a polymer and an inorganic material.

The inorganic layer includes inorganic particles and a binder, and the inorganic particle is one or more selected from alumina, silica, magnesia, titania, ceria, tin oxide, ceria, nickel oxide, zinc oxide, calcium oxide, zirconium oxide, cerium oxide, silicon carbide, boehmite, aluminum hydroxide, magnesium hydroxide, calcium hydroxide, and barium sulfate. The binder is one or more selected from polyvinylidene fluoride, a copolymer of vinylidene fluoride-hexafluoropropylene, polyamide, polyacrylonitrile, polyacrylate, polyacrylic acid, polyacrylate, polyvinylpyrrolidone, polyvinyl ether, polymethyl methacrylate, polytetrafluoroethylene, and polyhexafluoropropylene.

The polymer layer contains a polymer, and the material of the polymer is at least one selected from polyamide, polyacrylonitrile, acrylate polymer, polyacrylic acid, polyacrylate, polyvinylpyrrolidone, polyvinyl ether, polyvinylidene fluoride, and poly(vinylidene fluoride-hexafluoropropylene).

VII. Electrochemical Device

The examples of the present application provide an electrochemical device that includes any device which has an electrochemical reaction.

In some examples, the electrochemical device according to the present application includes a cathode having a cathode active material capable of intercalating or releasing metal ions; an anode according to the examples of the present application; an electrolytic solution; and a separator between the cathode and the anode.

In some examples, the electrochemical device of the present application includes, but is not limited to, all types of primary batteries, secondary batteries, fuel cells, solar cells, or capacitors.

In some examples, the electrochemical device is a lithium secondary battery.

In some examples, the lithium secondary battery includes, but is not limited to, a lithium metal secondary battery, a lithium ion secondary battery, a lithium polymer secondary battery, or a lithium ion polymer secondary battery.

VIII. Electronic Device

The electronic device according to the present application may be any device that uses the electrochemical device according to the examples of the present application.

According to some examples of the present application, the electronic device includes, but is not limited to, a notebook computer, a pen input type computer, a mobile computer, an e-book player, a portable phone, a portable fax machine, a portable copy machine, a portable printer, a headset, stereo headphones, a VCR, a LCD TV, a portable cleaner, a portable CD player, a mini disc, a transceiver, an electronic notebook, a calculator, a memory card, a portable recorder, a radio, a backup power device, a motor, a car, a motorcycle, a power bicycle, a bicycle, a lighting fixture, a toy, a game console, a clock, a power tool, a flashlight, a camera, a large household battery or a lithium ion capacitor.

Hereinafter, the lithium ion battery will be taken as an example and combined with specific examples to explain the preparation of the lithium ion battery. Those skilled in the art will understand that the preparation methods described in the present application are merely examples, and any other suitable preparation methods are all within the scope of the present application.

Examples

The performance evaluation of the lithium ion batteries of the examples and comparative examples according to the present application is explained below.

1. Preparation of Anode Material

The anode materials of Examples 1 to 8 and Comparative Examples 1 to 5 were prepared according to the method as follows:

(1) dispersing about 100 g of silicon monoxide powder in about 300 ml of ethanol as an organic solvent, adding about 2.2 g of polyvinylpyrrolidone (PVP) as a pore-forming agent, and stirring for about 0.5-1 h until a uniform suspension was formed;

(2) adding about 0.5 g to 10 g of an oxide precursor MeX to the above suspension, stirring for about 0.5 h to 1 h until a homogeneous mixed solution was formed, adding deionized water dropwise to the mixed solution, wherein the weight of the deionized water was about 3 times the weight of the precursor MeX, and after the dropwise addition was completed, reacting for about 4 h to obtain a mixed solution;

(3) spray-drying the above mixed solution (inlet temperature 220° C., outlet temperature 120° C.) to obtain powder, sintering the powder at about 450° C. to 900° C., pulverizing, and sieving using a 400-mesh sieve to obtain a porous oxide layer-coated silicon-oxygen material powder;

(4) dispersing 100 g of the sample obtained in step (3) in about 300 ml of ethanol as an organic solvent, adding about 5 g to 20 g of a carbon precursor (obtained by mixing phenolic resin and hexamethylenetetramine as a curing agent in a weight ratio of about 9:1), uniformly mixing after dissolving to obtain a mixed solution, and spray-drying (inlet temperature 220° C., outlet temperature 120° C.) to obtain powder; and (5) sintering the powder obtained in step (5) at about 700° C. to 1300° C., pulverizing, then sieving using a 400-mesh sieve and grading to obtain the anode material.

The materials and process conditions used in each step were listed in Table 1. According to the anode material of the present application, the pore-forming agent PVP was added during the first preparation step, and since PVP is an organic polymer, residual carbon was generated after sintering. Therefore, in the sample obtained after the sintering in step (3), the residual carbon was distributed in the porous oxide layer. The content of the residual carbon in the porous oxide layer in each example was listed in Table 1. The content was measured after the sieving step of step (3), that is, calculated based on the total weight of the porous oxide-coated silicon-oxygen material.

TABLE 1

| Number | Silicon monoxide material | Oxide precursor | Sintering process of step (3) | Carbon content after sieving of step (3) | Carbon precursor | Sintering process of step (5) |
|---|---|---|---|---|---|---|
| Example 1 | 100 g | Aluminum isopropoxide 0.5 g | N2 flow rate: 1.5 L/min, raising temperature to 600° C. at 3° C./minute, holding for 2 h | 0.309 wt % | Thermoplastic phenolic resin 9 g and hexamethylene tetramine 1 g | N2 flow rate: 1.5 L/min, raising temperature to 900° C. at 3° C./minute, holding for 2 h |
| Example 2 | 100 g | Aluminum isopropoxide 1 g | N2 flow rate: 1.5 L/min, raising temperature to 600° C. at 3° C./minute, holding for 2 h | 0.347 wt % | Thermoplastic phenolic resin 9 g and hexamethylene tetramine 1 g | N2 flow rate: 1.5 L/min, raising temperature to 900° C. at 3° C./minute, holding for 2 h |
| Example 3 | 100 g | Isopropyl titanate 0.5 g | N2 flow rate: 1.5 L/min, raising temperature to 600° C. at 3° C./minute, holding for 2 h | 0.348 wt % | Thermoplastic phenolic resin 9 g and hexamethylene tetramine 1 g | N2 flow rate: 1.5 L/min, raising temperature to 900° C. at 3° C./minute, holding for 2 h |
| Example 4 | 100 g | Isopropyl titanate 1 g | N2 flow rate: 1.5 L/min, raising temperature to 600° C. at 3° C./minute, holding for 2 h | 0.319 wt % | Thermoplastic phenolic resin 9 g and hexamethylene tetramine 1 g | N2 flow rate: 1.5 L/min, raising temperature to 900° C. at 3° C./minute, holding for 2 h |
| Example 5 | 100 g | Isopropyl titanate 10 g | N2 flow rate: 1.5 L/min, raising temperature to 600° C. at 3° C./minute, holding for 2 h | 0.325 wt % | Thermoplastic phenolic resin 9 g and hexamethylene tetramine 1 g | N2 flow rate: 1.5 L/min, raising temperature to 900° C. at 3° C./minute, holding for 2 h |
| Example 6 | 100 g | Aluminum isopropoxide 10 g | N2 flow rate: 1.5 L/min, raising temperature to 600° C. at 3° C./minute, holding for 2 h | 0.351 wt % | Thermoplastic phenolic resin 9 g and hexamethylene tetramine 1 g | N2 flow rate: 1.5 L/min, raising temperature to 900° C. at 3° C./minute, holding for 2 h |
| Example 7 | 100 g | Aluminum isopropoxide 1 g | N2 flow rate: 1.5 L/min, raising temperature to 600° C. at 3° C./minute, holding for 2 h | 0.332 wt % | Thermoplastic phenolic resin 9 g and hexamethylene tetramine 1 g | N2 flow rate: 1.5 L/min, raising temperature to 1100° C. at 3° C./minute, holding for 2 h |
| Example 8 | 100 g | Aluminum isopropoxide 1 g | N2 flow rate: 1.5 L/min, raising temperature to 600° C. at 3° C./minute, holding for 2 h | 0.310 wt % | Thermoplastic phenolic resin 4.5 g and hexamethylene tetramine 0.5 g | N2 flow rate: 1.5 L/min, raising temperature to 900° C. at 3° C./minute, holding for 2 h |
| Comparative Example 1 | 100 g | Isopropyl titanate 1 g | N2 flow rate: 1.5 L/min, raising temperature to 600° C. at 3° C./minute, holding for 2 h | 0.313 wt % | — | — |
| Comparative Example 2 | 100 g | Aluminum isopropoxide 1 g | N2 flow rate: 1.5 L/min, raising temperature to 600° C. at 3° C./minute, holding for 2 h | 0.342 wt % | — | — |

TABLE 1-continued

| Number | Silicon monoxide material | Oxide precursor | Sintering process of step (3) | Carbon content after sieving of step (3) | Carbon precursor | Sintering process of step (5) |
|---|---|---|---|---|---|---|
| Comparative Example 3 | 100 g | — | — | <0.030 wt % | Thermoplastic phenolic resin 4.5 g and hexamethylene tetramine 0.5 g | N2 flow rate: 1.5 L/min, raising temperature to 900° C. at 3° C./minute, holding for 2 h |
| Comparative Example 4 | 100 g | — | — | <0.030 wt % | Thermoplastic phenolic resin 9 g and hexamethylene tetramine 1 g | N2 flow rate: 1.5 L/min, raising temperature to 900° C. at 3° C./minute, holding for 2 h |
| Comparative Example 5 | 100 g | — | — | <0.030 wt % | — | — |

2. The Powder Properties of the Anode Materials Obtained in Examples 1 to 8 and Comparative Examples 1 to 5 were Tested. The Powder Properties Testing Method were as Follows:

(1) Observation of microscopic morphology of the powder particles: the microscopic morphology of the powder was observed by a scanning electron microscope (SEM). The coating condition of the material surface was characterized. The test instrument was an OXFORD EDS (X-max-20 mm$^2$), the acceleration voltage was 15 KV, the focal length was adjusted, high magnification observation was performed from 50K, and at low-magnification 500 to 2000, the particle agglomeration was mainly observed.

(2) Specific surface area test: after measuring the adsorption amount of gas on the solid surface at different relative pressures under constant temperature and low temperature, the single molecule layer adsorption amount of the sample was obtained based on the Brownor-Ett-Taylor adsorption theory and its formula (BET formula), thereby calculating the specific surface area of the solid.

1.5 g to 3.5 g of a powder sample was placed into a test tube of a TriStar II 3020 and the specific surface area was tested after degassing at 200° C. for 120 min (3) Particle size test: about 0.02 g of a powder sample was added to a 50 ml clean beaker, about 20 ml of deionized water was added, and a few drops of 1% surfactant were added dropwise, so that the powder was completely dispersed in water. Ultrasonic cleaning was performed in a 120 W ultrasonic cleaning machine for 5 minutes, and the particle size distribution was tested by using a MasterSizer 2000.

(4) True Density Test: Referring to GB/T 24586 "Test for Apparent Density, True Density and Porosity of Iron Ore" and the test equipment AccuPyc II 1340 was selected for testing.

(5) Tap density: GB/T 5162-2006 "Determination of tap density of metal powder" was adopted, the clean and dry 100 cm$^3$ three-sided scale (the scale spacing was 1 cm$^3$, and the measurement accuracy was ±0.5 cm$^3$) mass Mg was firstly weighed, and a certain mass of the powder sample was added, so that the scale of the powder sample was located at the ½ to ⅔ range, and the measuring cylinder mouth was sealed with a sealing film. The measuring cylinder loaded with the powder was placed on a mechanical vibration device at 100 times/min to 300 times/min, and after shaking for 5000 times, the tap density was obtained according to the mass/vibration volume.

(6) Carbon content test: the sample was heated and burnt by a high temperature furnace under a high oxygen condition to oxidize carbon and sulfur to carbon dioxide and sulfur dioxide respectively. After treated, the gas entered a corresponding absorption pool and was absorbed the corresponding infrared radiation, and was then converted by the detector into a corresponding signal. Such signal was sampled by a computer, linearly corrected and converted to a value directly proportional to the concentration of the carbon dioxide and sulfur dioxide, and then the values of the entire analysis process were accumulated. After the analysis was finished, the accumulated values were divided by the weight value, and multiplied by a correction factor in the computer, and after the blank was subtracted, the percentage of the carbon and sulfur in the samples were obtained. The sample was tested by using a Shanghai Dekai HCS-140, a high frequency infrared carbon sulfur analyzer.

3. The Electrical Property Test was Performed on the Anode Materials Obtained in Examples 1 to 8 and Comparative Examples 1 to 5, Wherein, the Electrical Property Test Method was Performed as Follows:

The anode materials obtained in Examples 1 to 8 and Comparative Examples 1 to 5, the conductive carbon black and the binder PAA were mixed in a weight ratio of about 80:10:10, deionized water was added and stirred into the slurry. The slurry was scraped with a scraper blade to the coating with a thickness of about 100 μm, dried in a vacuum drying oven at about 85° C. for about 12 h, and cut into wafers having a diameter of about 1 cm by a punch in a dry environment. A lithium metal sheet was used as a counter electrode in a glove box. The separator was a celgard composite film. An electrolytic solution was added (the weight ratio of EC to DEC was equal to about 3:7, the concentration of lithium hexafluorophosphate was about 1 M, and the FEC accounted for about 5 wt % of the electrolytic solution) so as to assemble into button batteries. The batteries were subjected to a charging and discharging test by using the LAND series battery tests to test the charging and discharging performances thereof.

The test results of the powder properties and electrical properties of the anode materials obtained in Examples 1 to 8 and Comparative Examples 1 to 5 were listed in Table 2.

TABLE 2

| Number | Specific surface area (cm²/g) | Particle size range (μm) | True density (g/cm³) | Tap density (g/cm³) | Carbon content (wt %) | First reversible capacity (0.005 V to 0.8 V) | First efficiency* |
|---|---|---|---|---|---|---|---|
| Example 1 | 4.50 | 4.5 to 33 | 2.304 | 0.9 | 4.096 | 1301 | 68.5% |
| Example 2 | 4.88 | 2.5 to 36 | 2.309 | 0.9 | 5.24 | 1285 | 70.3% |
| Example 3 | 9.93 | 3.3 to 32 | 2.286 | 0.9 | 4.608 | 1295 | 72.2% |
| Example 4 | 16.23 | 4.5 to 36 | 2.310 | 0.9 | 4.378 | 1287 | 69.1% |
| Example 5 | 6.7 | 3.0 to 27 | 2.278 | 0.9 | 4.257 | 1270 | 68.7% |
| Example 6 | 15.6 | 4.0 to 55 | 2.312 | 0.9 | 4.005 | 1320 | 66.7% |
| Example 7 | 18.32 | 3.5 to 42 | 2.318 | 0.9 | 2.36 | 1321 | 71.5% |
| Example 8 | 7.68 | 6.0 to 38 | 2.310 | 0.9 | 3.907 | 1259 | 73.4% |
| Comparative Example 1 | 4.04 | 2.0 to 12 | 2.300 | 1.0 | 0.17 | 1290 | 65% |
| Comparative Example 2 | 4.25 | 2.2 to 30 | 2.300 | 1.0 | 0.15 | 1286 | 64% |
| Comparative Example 3 | 4.10 | 2.8 to 23 | 2.307 | 0.9 | 2.18 | 1300 | 68% |
| Comparative Example 4 | 4.5 | 2.2 to 30 | 2.307 | 0.9 | 4.32 | 1285 | 65% |
| Comparative Example 5 | 4.2 | 2.1 to 12 | 2.306 | 1.0 | 0.01 | 1296 | 63% |

The first efficiency in the table=the capacity corresponding to the charging cut-off voltage of 0.8 V/the capacity corresponding to discharging cut-off voltage of 0.005 V.

4. Anode Material Properties Evaluated on a Full Battery (1) Preparation of the Battery The active material LiCoO₂, conductive carbon black, and the binder polyvinylidene fluoride (PVDF) were fully stirred and mixed uniformly in a N-methylpyrrolidone solvent system in a weight ratio of about 96.7:1.7:1.6, and then coated on an Al foil, and dried and cold-pressed to obtain a cathode.

Graphite was mixed with the anode materials obtained in Examples 1 to 8 and Comparative Examples 1 to 5 in a certain weight ratio respectively to obtain a mixed powder having a gram capacity of 430 mAh/g. The mixed powder, the conductive agent acetylene black, and PAA were fully stirred in deionized water in a weight ratio of about 95:1.2:3.8, and uniformly mixed, coated on a Cu foil, dried and cold-pressed to obtain an anode.

A PE porous polymeric membrane was used as a separator. The cathode, the separator and the anode were stacked in order, so that the separator was between the cathode and anode to act as an isolator, and wound to obtain a bare battery. The bare battery was placed in an outer package, and injected with a well-prepared electrolytic solution (the weight ratio of EC to DEC was equal to about 3:7, the concentration of lithium hexafluorophosphate was about 1 M, and the FEC accounted for about 5 wt % of the electrolytic solution) and packaged. After formation, degassing, trimming and other processes, the full battery cell was obtained.

(2) High temperature cycle test: the test temperature was 45° C., the battery was charged to 4.4 V at a constant current of 0.7 C, charged to 0.025 C at a constant voltage, allowed to stand for 5 minutes, and was then discharged to 3.0 V at 0.5 C. The capacity obtained above was taken as the initial capacity, a 0.7° C. charge/0.5° C. discharge cycle test was performed, and the ratio of the capacity of each step to the initial capacity was calculated to obtain a capacity attenuation curve.

(3) Discharge rate test: at 25° C., the battery cell was discharged to 3.0 V at 0.2 C, and allowed to stand for 5 min, then charged to 4.4 V at 0.5 C, charged to 0.05 C at constant voltage, and allowed to stand for 5 min, the discharge rate was adjusted, the discharging test was performed at 0.2 C, 0.5 C, 1 C, 1.5 C, and 2.0 C respectively, and the discharge capacities were obtained respectively. The capacity obtained at each rate was compared with the capacity obtained at 0.2 C to obtain a ratio, and the rate performance was compared by comparing such ratio.

(4) DCR test: a Maccor machine was used to test the actual capacity of the battery at 25° C. (the battery was charged to 4.4 V at the constant current of 0.7 C, charged to 0.025 C at constant voltage, allowed to stand for 10 min, discharged to 3.0 V at 0.1 C, and allowed to stand for 5 min), the battery was discharged at 0.1 C to a certain state of charge (SOC), is discharging was tested, sampling was performed every 5 ms, and the DCR values at different SOCs were calculated.

The test results were listed in Table 3.

TABLE 3

| Number | Cycle number of fading to 80% | Capacity retention rate after 400 cycles | Rate (2 C discharge capacity /0.2 C discharge capacity) | DCR (values at 10% SOC, Ω, at room temperature) |
|---|---|---|---|---|
| Example 1 | 360 | 74% | 92.3% | 62 |
| Example 2 | 364 | 78% | 92.6% | 64 |
| Example 3 | 355 | 70% | 93.0% | 62 |
| Example 4 | 350 | 68% | 92.5% | 61 |
| Example 5 | 329 | 69% | 91.0% | 65 |
| Example 6 | 320 | 70% | 90.0% | 65 |
| Example 7 | 340 | 72% | 89.5% | 68 |
| Example 8 | 310 | 65% | 87.2% | 60 |
| Comparative Example 1 | 264 | 46% | 89.1% | 72 |
| Comparative Example 2 | 250 | 54% | 85.1% | 70 |
| Comparative Example 3 | 210 | — | 89.1% | 65 |
| Comparative Example 4 | 200 | — | 91.3% | 70 |
| Comparative Example 5 | 288 | — | 85.2% | 73 |

The "-" represented that the capacity retention rate was below 30% or lower before 400 cycles.

The test results of Example 1, Example 2 and Example 6 and Comparative Example 4 show that the introduction of the $Al_2O_3$ layer as an intermediate layer in the anode material could remarkably improve the high temperature cycle life of the battery and could reduce the impedance of the battery. In Example 1, Example 2, and Example 6, by controlling the content of an alumina precursor, the $Al_2O_3$ layer having different coating thicknesses could be obtained. It can be seen that as the content of the precursor increased (i.e., as the thicknesses of the $Al_2O_3$ layer increased), the high temperature cycle performance of the battery firstly became better and then deteriorated, and the impedance gradually decreased as the thickness increased. Therefore, it can be seen that the content of the alumina precursor in Example 2 was the optimum content.

The test results of Example 3, Example 4 and Example 5 and Comparative Example 4 show that the introduction of the $TiO_2$ layer as an intermediate layer in the anode material could also significantly improve the high temperature cycle life of the battery and reduce the impedance of the battery. In Example 3, Example 4, and Example 5, by controlling the content of a titanium precursor, the $TiO_2$ layer having different coating thicknesses could be obtained. It can be seen that as the content of the precursor increased (i.e., as the thicknesses of the $TiO_2$ layer increased), the high temperature cycle performance of the battery gradually deteriorated, perhaps because the thicker intermediate layer increased the risk of overall destruction and peeling of the material.

The test results of Example 1 and Example 3 show that in the case that the precursor contents were low (i.e., the thickness of the intermediate layer was small), the cycle performance of the battery with $Al_2O_3$ as the intermediate layer and the cycle performance of the battery with $TiO_2$ as the intermediate layer had little difference, and the capacity retention rate of the battery with $Al_2O_3$ as the intermediate layer after 400 cycles was about 4% higher.

The test results of Example 2 and Example 4 show that the battery with $Al_2O_3$ as the intermediate layer had a capacity retention ratio of about 10% higher than that of the battery with $TiO_2$ as the intermediate layer.

The test results of Example 5 and Example 6 show that when the content of the precursor was high, both the batteries with $Al_2O_3$ or $TiO_2$ as the intermediate layer had good high temperature cycle performance, and the high temperature cycle performances of them had little difference.

The test results of Example 2 and Comparative Example 2 show that merely a coating of the intermediate layer with alumina could not significantly improve the high temperature cycle performance of the battery, and the capacity retention rate after 400 cycles was only about 54%, which was much lower than the capacity retention rate after 400 cycles (about 78%) of the battery containing an intermediate oxide layer and a carbon layer simultaneously. Meanwhile, the test results of Example 4 and Comparative Example 1 can also show that merely coating the intermediate layer with $TiO_2$ could not achieve the same effect, either. Therefore, only the combination of the intermediate oxide layer and the carbon coating on the surface could improve the cycle performance of the material.

Figure 3:
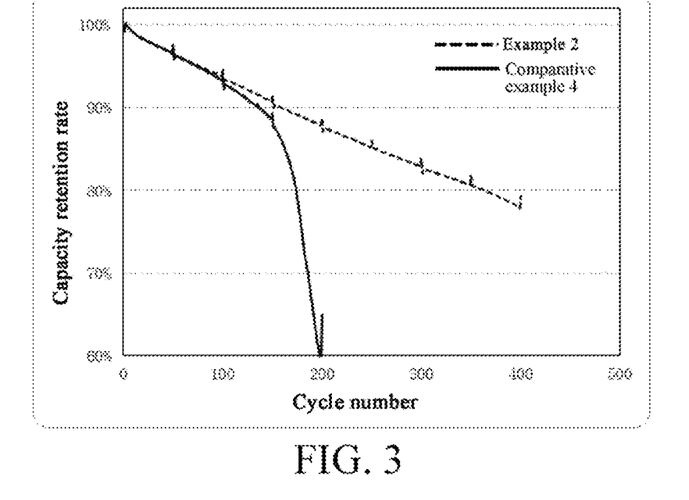

The test results of Example 2 and Comparative Example 4 show that the design of the intermediate $Al_2O_3$ layer could significantly improve the cycle performance of the battery. As can be seen from the cycle attenuation curves of Example 2 and Comparative Example 4 shown in FIG. 3, due to the design of the intermediate alumina layer, the cycle number when the capacity retention rate of the battery was decayed to 80% was nearly doubled.

Figure 4A:
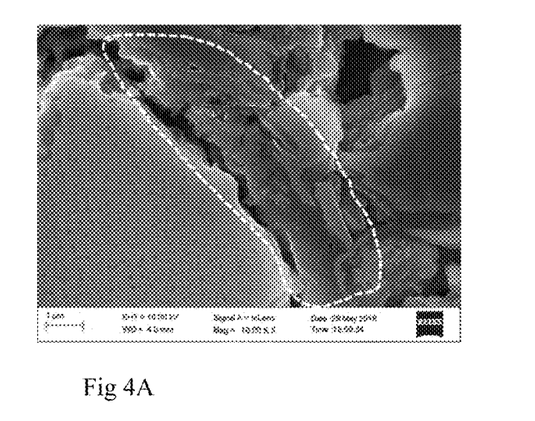
FIG. 4A shows an SEM picture of the cross section of the anode after 200 cycles of the battery of Comparative Example 4 of the present application.
Figure 4B:
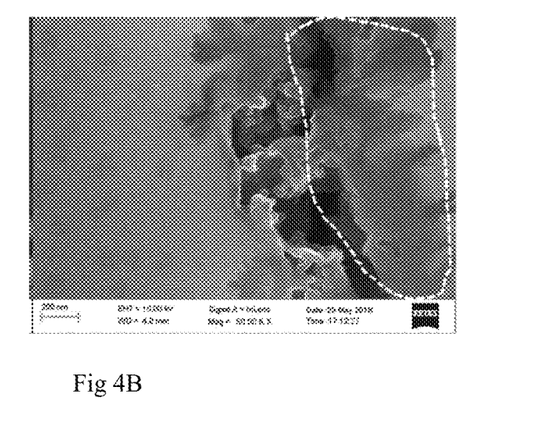
FIG. 4B shows an SEM picture of the cross section of the anode after 200 cycles of the battery of Example 2 of the present application.

FIG. 4A shows an SEM picture of the cross section of the anode after 200 cycles of the battery of Comparative Example 4 of the present application; and FIG. 4B shows an SEM picture of the cross section of the anode after 200 cycles of the battery of Example 2 of the present application. It can be seen that after the silicon-oxygen material particles free of the porous intermediate layer in Comparative Example 4 are cycled, the SEI membrane is peeled off from the surface of the particles. After the silicon-oxygen material particles provided with the porous intermediate layer in Example 2 are cycled, the SEI membrane firmly covers the surface without peeling.

The test results of Example 4 and Comparative Example 4 show that the design of the intermediate $TiO_2$ layer can also improve the high temperature cycle performance of the battery. The above test results can demonstrate that the design of the intermediate oxide layer can significantly improve the cycle performance of the battery.

The test results of Example 2 and Example 8 and Comparative Example 2 indicate that the high temperature cycle performance is relevant to the carbon content of the anode material. The higher carbon content is beneficial to improve the conductivity of the material, thereby significantly improving the cycle performance of the battery and reducing the impedance of the battery. However, due to the difficulty of the preparation process of the material, when the content of the carbon coating layer is high, the anode material is prone to adhesion agglomeration, and the carbon content in Example 2 is the optimal carbon content.

The test results of Examples 1 to 8 and Comparative Example 5 show that due to the combined effect of the introduction of the intermediate oxide layer and the coating of the surface carbon layer, the high temperature cycle performance and rate performance of the battery can be significantly improved, and the impedance is reduced.

What is claimed is:

1. An anode material, comprising:
    a silicon compound $SiO_x$, wherein x is about 0.5 to 1.5;
    an $MeO_y$ layer, the $MeO_y$ layer coating the silicon compound $SiO_x$, wherein Me comprises at least one of Al, Si, Ti, Mn, V, Cr, Co, and Zr, wherein y is about 0.5 to 3; and
    a carbon layer, wherein the carbon layer coats the $MeO_y$ layer;
    wherein the surface of the $MeO_y$ layer adjacent to the carbon layer has an open pore structure, and at least a part of the open pore structure is filled with the carbon layer; and
    wherein a specific surface area of the anode material is about 2 $cm^2/g$ to 20 $cm^2/g$.
2. The anode material according to claim 1, wherein the specific surface area of the anode material is about 5 $cm^2/g$ to 20 $cm^2/g$.
3. The anode material according to claim 1, wherein the $MeO_y$ layer further comprises a non-open pore structure.
4. The anode material according to claim 1, wherein the silicon compound $SiO_x$ comprises SiO, or a combination of SiO and $SiO_2$.
5. The anode material according to claim 1, wherein the $MeO_y$ layer comprises $TiO_2$, $Al_2O_3$, or a combination thereof.
6. The anode material according to claim 1, wherein the $MeO_y$ layer contains carbon; wherein, based on a total weight of the silicon compound $SiO_x$ and the $MeO_y$ layer, a content of the carbon in the $MeO_y$ layer is about 0.1 wt % to 1 wt %.
7. The anode material according to claim 6, wherein the content of the carbon in the $MeO_y$ layer is about 0.2 wt % to 0.4 wt %.
8. The anode material according to claim 1, wherein an average particle diameter of the silicon compound $SiO_x$ is about 500 nm to 30 μm.
9. The anode material according to claim 1, wherein a thickness of the $MeO_y$ layer is about 2 nm to 1000 nm.
10. The anode material according to claim 9, wherein the thickness of the $MeO_y$ layer is about 5 nm to 50 nm.
11. The anode material according to claim 1, wherein a thickness of the carbon layer is about 2 nm to 1000 nm.
12. The anode material according to claim 11, wherein the thickness of the carbon layer is about 10 nm to 100 nm.
13. The anode material according to claim 1, wherein a content of carbon comprised in the anode material is about 1 wt % to 6 wt % based on a total weight of the anode material.
14. The anode material according to claim 1, wherein the specific surface area of the anode material is about 5 $cm^2/g$ to 10 $cm^2/g$.
15. A method for preparing the anode material according to claim 1, the method comprising:
    (1) forming a mixed solution of $SiO_x$ powder, a pore-forming agent and an oxide precursor $MeX_n$ in the presence of an organic solvent and deionized water;
    drying the mixed solution to obtain powder; and
    sintering the powder to obtain silicon compound $SiO_x$ particles coated with an oxide $MeO_y$ layer; and
    (2) mixing the silicon compound $SiO_x$ particles coated with the $MeO_y$ layer, an organic solvent and a carbon precursor to form a mixed solution;
    drying the mixed solution to obtain powder; and
    sintering the powder to obtain the anode material;
    wherein x is about 0.5 to 1.5 and y is about 0.5 to 3,
    wherein Me comprises at least one of Al, Si, Ti, Mn, Cr, V, Co, and Zr,
    wherein X comprises at least one of a methoxy group, an ethoxy group, an isopropoxy group, and a halogen,
    wherein n is 1, 2, 3 or 4, and
    wherein a specific surface area of the anode material is about 2 $cm^2/g$ to 20 $cm^2/g$.
16. An electrochemical device, comprising an anode, wherein the anode comprises anode material, wherein the anode material comprise
    a silicon compound $SiO_x$, wherein x is about 0.5 to 1.5;
    an $MeO_y$ layer, the $MeO_y$ layer coating the silicon compound $SiO_x$, wherein Me comprises at least one of Al, Si, Ti, Mn, V, Cr, Co, and Zr, wherein y is about 0.5 to 3; and
    a carbon layer, wherein the carbon layer coats the $MeO_y$ layer;
    wherein the surface of the $MeO_y$ layer adjacent to the carbon layer has an open pore structure, and at least a part of the open pore structure is filled with the carbon layer, and
    wherein a specific surface area of the anode material is about 2 $cm^2/g$ to 20 $cm^2/g$.
17. The electrochemical device according to claim 16, wherein the specific surface area of the anode material is about 5 $cm^2/g$ to 20 $cm^2/g$.
18. An electronic device, comprising the electrochemical device according to claim 16.
19. The electronic device according to claim 18, wherein the specific surface area of the anode material is about 5 $cm^2/g$ to 20 $cm^2/g$.

* * * * *